April 25, 1944.   R. A. FORESMAN   2,347,550
MATERIAL HANDLING APPARATUS
Filed Dec. 10, 1941   2 Sheets-Sheet 2
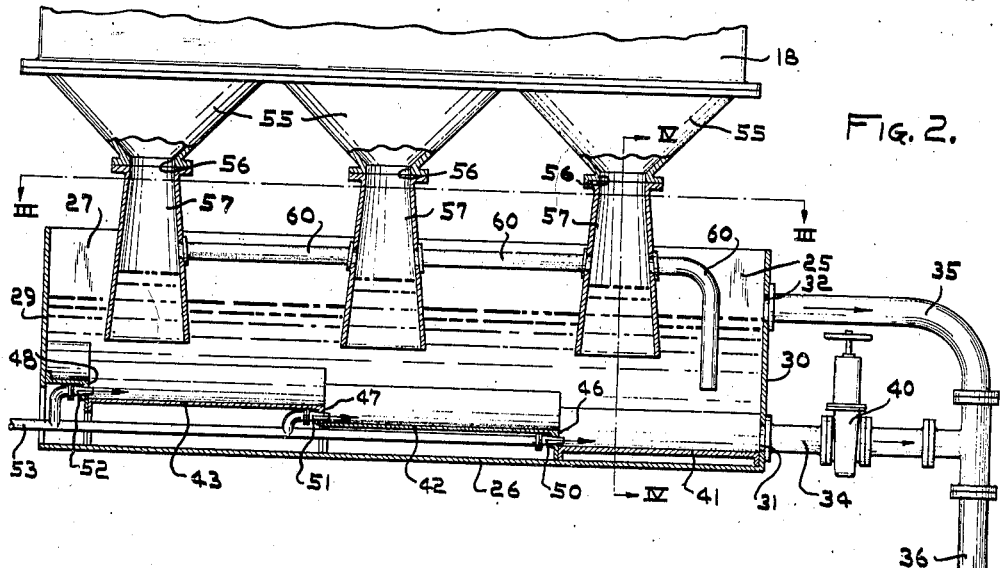
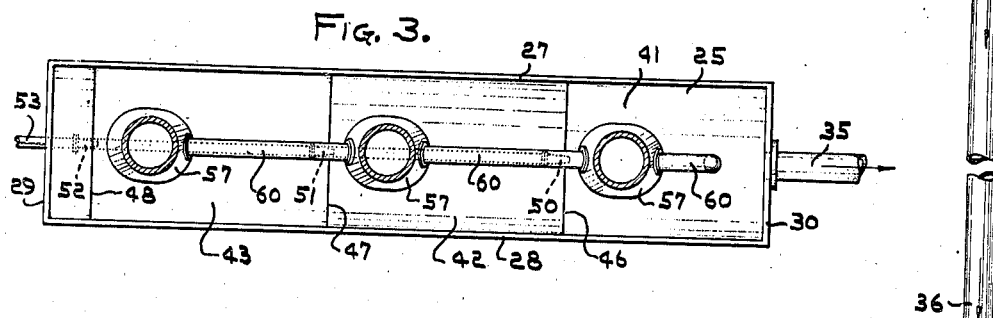
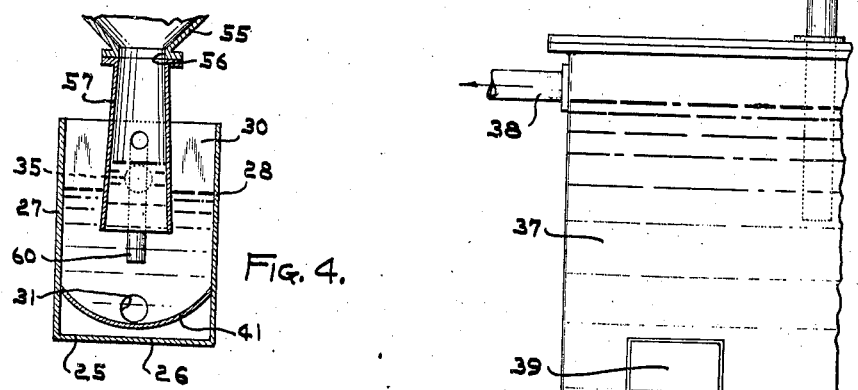
INVENTOR
ROBERT A. FORESMAN.
BY
ATTORNEY Patented Apr. 25, 1944

2,347,550

UNITED STATES PATENT OFFICE 2,347,550

MATERIAL-HANDLING APPARATUS

Robert A. Foresman, Prospect Park, Pa., assignor to Westinghouse Electric & Manufacturing Company, East Pittsburgh, Pa., a corporation of Pennsylvania Application December 10, 1941, Serial No. 422,414

3 Claims. (Cl. 302—15)

The present invention relates to material handling apparatus, more particularly to hydraulic conveyors for the solid products of combustion from furnaces, and it has for an object the provision of improved apparatus of this character.

With pulverized fuel fired furnaces, the disposition of the fly ash removed from the flue gases constitutes a major problem. In large central station installations the amount of fly ash removed from the furnace gases during a twenty-four hour period may equal 200 tons, or more.

This problem is particularly difficult with that type of pulverized fuel fired combustion apparatus where the mechanism for removing the fly ash from the flue gases is located above the boiler. In many installations, the boiler is 75 feet or more in height and the fly ash precipitator or separator is frequently located above the top of the boiler. In such cases, the space between the precipitator and the top of the boiler available for ash removal mechanism is very limited, as any increase in the height of this space necessitates a corresponding increase in the height of the power plant, and at such heights, any such increase would be relatively very expensive.

Heretofore, it has been believed that fly ash could not be removed and transported from this location successfully by hydraulic means, and as a result, in actual practice, fly ash has been collected dry and transported in that state to a hopper outside of the plant. Generally, pneumatic means have been relied upon in such removal of fly ash from the separator to the externally-located hopper. The use of pneumatic conveying means in such installations produces an undesired result in that there is generally considerable leakage of air from the conveying system to the separator, thereby reducing the efficiency of the induced draft fan tending to create a vacuum or subatmospheric pressure in the separator and connecting ducts.

The present invention contemplates the elimination of these and other difficulties by the provision of novel hydraulic material-transporting mechanism. Therefore, another object of the invention is the provision of a closed hydraulic material-conveying system.

A further object of the invention is the provision of a closed and sealed hydraulic system for conveying fly ash from a point in the flow path of gases through combustion apparatus where the pressure is below atmospheric to a place of discharge which is at atmospheric pressure.

These and other objects are effected by the invention as will be apparent from the following description and claims taken in connection with the accompanying drawings forming a part of this application, in which:

Fig. 2 is an enlarged detail view of a portion of the apparatus shown in Fig. 1;

Fig. 3 is a sectional view taken along the line III—III of Fig. 2, looking in the direction of the arrows; and, Fig. 4 is a sectional view taken along the line IV—IV of Fig. 2, looking in the direction of the arrows.

Figure 1:
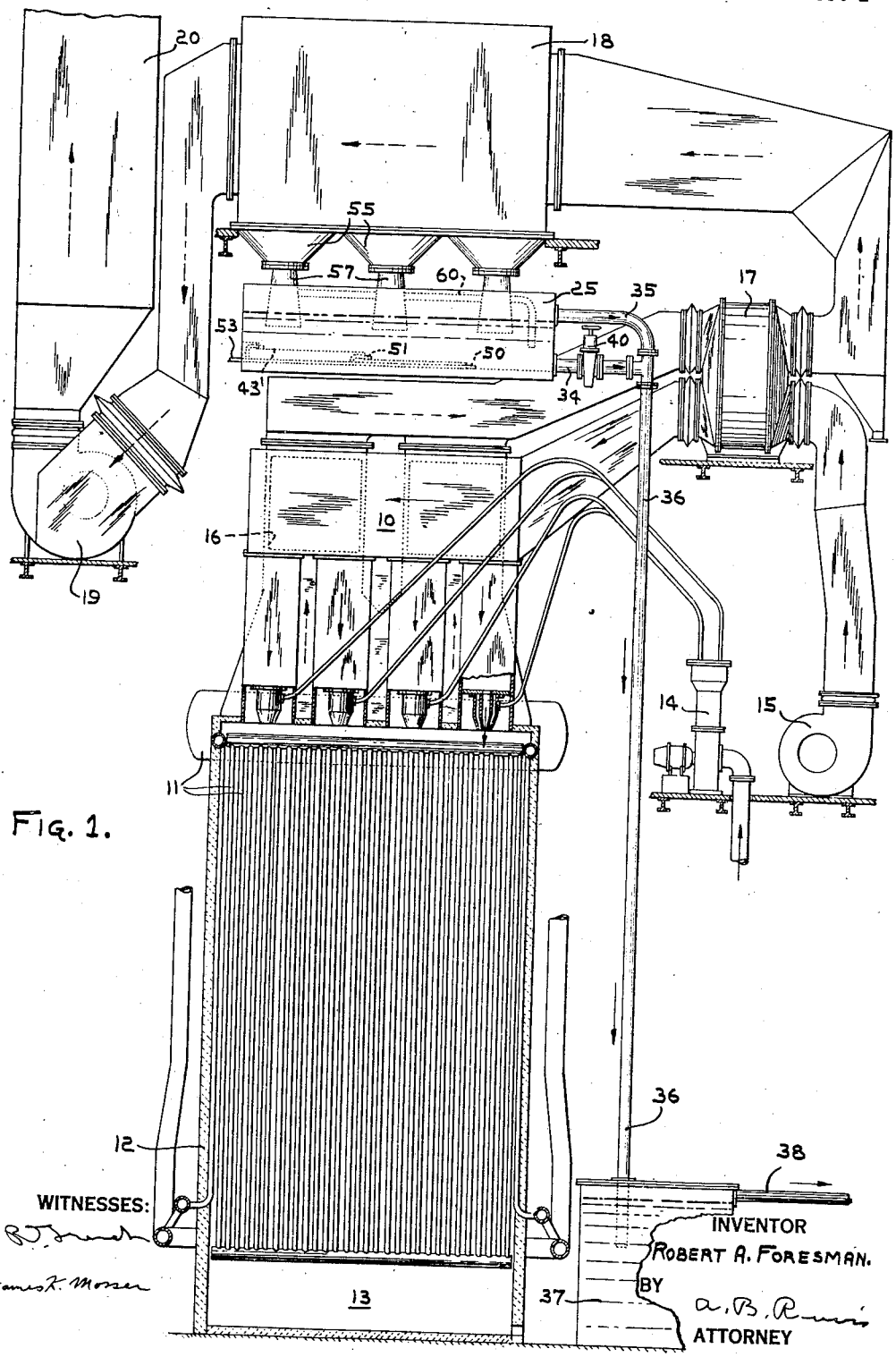
Fig. 1 is a side elevational view of combustion apparatus, with portions thereof broken away for the sake of clearness.

Referring now to the drawings more in detail, there is shown at 10, in Fig. 1, a combustion apparatus installation which may be considered conventional insofar as the boiler 11, furnace 12, slag pit 13, pulverized fuel feeding mechanism 14, forced draft fan 15, economizer 16, preheater 17, precipitator 18, induced draft fan 19, and stack 20 are concerned.

There is provided, in the limited space between the separator 18 and the top of the boiler, a mixing tank 25 comprised by a bottom 26, side walls 27 and 28, and end walls 29 and 30, the end wall 30 having an outlet opening 31 near its lower edge and an overflow opening 32 near its upper edge. A pair of branch conduits 34 and 35 provide for communication between the openings 31 and 32, respectively, and a common discharge conduit 36 extending from the vicinity of the mixing tank to an energy-dissipating tank 37. Preferably, this latter tank 37 is located at or near the basement level of the plant containing the combustion apparatus, and is provided with an overflow connection to a main refuse discharge line 38 which extends from the tank 37 to a place of final discharge, generally located externally of the plant. Preferably, the tank 37 is provided with one or more clean-out openings 39 near the bottom thereof to permit of convenient removal from the tank of any accumulations of refuse therein. A valve 40 is provided in the branch conduit 34 to control flow through the discharge opening 31 for a purpose to be hereinafter more fully explained.

The bottom of the mixing tank 25 is provided with a plurality of horizontally-disposed steps 41, 42 and 43 having risers 46, 47 and 48, respectively. A plurality of nozzles 50, 51 and 52 are disposed with their discharge portions extending through the risers 46, 47 and 48, respectively. A supply line, such as shown at 53, furnishes water or other flushing liquid to the nozzles, whereby, during flushing periods, jets of liquid will be directed along the horizontal surfaces of the steps toward the discharge opening 31. Preferably, the steps 41, 42 and 43 are concave in cross-section, as best seen in Fig. 4.

The bottom of the separator 18 is formed in a plurality of sections 55 having downwardly-inclined walls converging to a plurality of outlet openings 56. Tubular members 57 provide closed passages extending from the discharge openings 56 to points within the mixing tank below the level of the overflow opening 32. Preferably, the lower ends of the tubular members 57 are positioned in overlying and spaced relationship with respect to the steps 41, 42 and 43. With this arrangement, any material collected within the separator 18 will be guided to and deposited on the various steps at the bottom of the mixing tank.

Inasmuch as the induced draft fan 19 normally maintains a sub-atmospheric pressure in the separator 18, it is desirable to have the lower ends of the tubular members 57 extending below the surface of water normally maintained in the mixing tank, which level is determined by the vertical position of the overflow opening 32. In this way, loss of vacuum within the separator 18 through the ash-handling apparatus is prevented. However, the lower pressure existing within the separator results in a higher level of water in the tubular members 57 than exists outside thereof, with the result that if the tubular members were of uniform diameter, there would be danger of clogging of the submerged portions by accumulations of waste material collected therein. To prevent the possibility of such clogging, that portion of the tubular members into which the water rises gradually increases in cross sectional area in a downward direction, as best shown in Fig. 2.

It will be apparent to those skilled in the art that the apparatus is capable of operation either intermittently or continuously, depending upon conditions within the particular plant. If the apparatus is to be operated intermittently, the valve 40, which controls the branch conduit 34, will normally be closed and sufficient water or other liquid will be supplied to the tank 25 through the jets 50, 51 and 52 to fill the tank to the level of the overflow opening 32, at which time the supply of water to the tank will be interrupted. When the quantity of fly ash or other solid particles of combustion removed from the flue gases by the separator and directed to the mixing tank by the tubular members 57 has reached the desired amount, the valve 40 will be opened and water supplied to the tank through the plurality of nozzles, the jets of water serving to agitate and maintain fluent the mixture of solid matter and water within the tank and also serving to assist in discharge thereof through the opening 31 and associated conduits 34 and 36 to the energy-dissipating tank 37 and thence to the main refuse line 38.

If the apparatus is to be operated continuously, the valve 40 may be closed and the water supplied by the nozzles will agitate and mix with the fly ash or other refuse deposited on the steps, the mixture leaving the tank by way of the overflow opening 32 and branch conduit 35 associated therewith.

In order to maintain the pressure uniform in all of the tubular members 57, there is provided an equilibrium pipe 60 interconnecting the members. Thus, if any member 57 becomes clogged, or the pressures at the various sections 55 of the separator 18 differ, the pipe 60 will serve to maintain equal pressures in all of the members.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. Material-handling apparatus comprising an enclosure for reception of dry material in a finely-divided state; a mixing tank below said enclosure, said tank having a stepped bottom and a discharge opening through a side wall opposed to the risers of the steps; means providing a supply of water to the tank and including a plurality of nozzles arranged to direct jets of water over the steps from the rear to the front thereof in the general direction of the discharge opening; and means providing for gravitational discharge of dry material from the enclosure to the tank, said means comprising a plurality of tubular members disposed with their upper ends in communication with corresponding discharge openings in the bottom of the enclosure and with their lower ends overlying the plurality of steps in spaced relation thereto.

2. Structure as specified in claim 1, including means for maintaining water in the tank at a predetermined level above the lower ends of the tubular members.

3. Material-handling apparatus comprising an enclosure for reception of dry material in a finely-divided state; a mixing tank below said enclosure; means providing a supply of water to the tank; means for normally maintaining a predetermined level of water therein; means providing for gravitational discharge of dry material from the enclosure to the body of water within the tank, said means comprising a plurality of tubular members disposed vertically with their upper ends in communication with corresponding discharge openings in the bottom of the enclosure and with their lower ends submerged in the body of water within the tank, said tubular members defining passages from the enclosure to the body of water, which passages gradually increase in cross-sectional area from a point materially above the maximum water level in the tank to their lower ends; and means providing communication between the passages defined by the tubular members at a point in the lengths thereof above the maximum water level therein.

ROBERT A. FORESMAN.